United States Patent
Han et al.

(10) Patent No.: US 9,503,918 B2
(45) Date of Patent: Nov. 22, 2016

(54) ENODEB AND UE FOR DYNAMIC CELL ON AND OFF

(71) Applicant: Intel IP Corporation, Santa Clara, CA (US)

(72) Inventors: Seunghee Han, San Jose, CA (US); Youn Hyoung Heo, San Jose, CA (US); Hong He, Beijing (CN); Jong-Kae Fwu, Sunnyvale, CA (US); Hwan-Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/554,221

(22) Filed: Nov. 26, 2014

(65) Prior Publication Data

US 2015/0271692 A1    Sep. 24, 2015

Related U.S. Application Data

(60) Provisional application No. 61/968,281, filed on Mar. 20, 2014.

(51) Int. Cl.
*H04L 12/26*    (2006.01)
*H04W 24/02*    (2009.01)
*H04L 5/00*    (2006.01)
*H04W 72/04*    (2009.01)

(52) U.S. Cl.
CPC ............ *H04W 24/02* (2013.01); *H04L 5/0032* (2013.01); *H04L 5/0082* (2013.01); *H04L 5/0098* (2013.01); *H04L 5/0023* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2014/0112308 A1* | 4/2014 | Kwon ............... H04W 56/0005 370/331 |
| 2014/0185576 A1* | 7/2014 | Lei ......................... H04L 5/001 370/329 |

* cited by examiner

*Primary Examiner* — Afshawn Towfighi
(74) *Attorney, Agent, or Firm* — Schwegman Lundberg & Woessner, P.A.

(57) ABSTRACT

Disclosed in some examples are methods, systems, and machine readable mediums which reuse existing LTE functionality to rapidly signal UEs on the availability of a LTE-U cell. Using these techniques the on/off operation can be in the order of a few milliseconds (ms). Several techniques are disclosed herein, including use of component carrier (CC) specific Discontinuous Reception (DRX) signaling, PDCCH signaling, DL assignment based signaling, Physical Hybrid Automatic Repeat Request Indicator Channel (PHICH) signaling, Beacon signaling, and the like.

23 Claims, 11 Drawing Sheets

ENODEB AND UE FOR DYNAMIC CELL ON AND OFF

PRIORITY CLAIM

This patent application claims the benefit of priority, under 35 U.S.C. Section 119 to U.S. Provisional Patent Application Ser. No. 61/968,281, entitled "METHODS FOR DYNAMIC CELL ON/OFF IN LICENSE/UNLICENSE SPECTRUM" filed on Mar. 20, 2014 to Seunghee Han et al, which is hereby incorporated by reference herein in its entirety.

TECHNICAL FIELD

Embodiments pertain to wireless technologies. Some embodiments relate to co-existence of differing wireless technologies.

BACKGROUND

Mobile devices utilizing high speed data connections based upon Long Term Evolution (LTE) and Long Term Evolution-Advanced (LTE-A) continue to increase in popularity. These mobile devices offer users the ability to download richer content and better user experiences on the go. For example, users may stream high definition videos, stream high quality music, play network games, download applications, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The increased demand for these mobile devices puts increasing pressure on wireless carriers to meet the demands of their increasing user base. Despite increasing efficiencies in using the existing licensed frequency spectrums for wireless technologies such as Universal Mobile Telecommunications (UMTS), LTE, and LTE-A, carriers are finding it difficult to meet demand for data services with their current bandwidth allocations.

LTE-Unlicensed (LTE-U) is an effort to utilized unlicensed spectrum, such as the Industrial, Scientific, and Medical (ISM) band. The goal is to increase the capacity of LTE networks through the use of these frequency bands. LTE-U features smaller cells with lower transmit power as compared to a standard LTE cell. In some examples, LTE-U may utilize carrier aggregation to aggregate co-located licensed and unlicensed cells. Carrier aggregation enables multiple LTE carriers to be used together to provide high data rates for 4G LTE Advanced.

While LTE-U offers the potential to increase the available bandwidth of LTE networks in order to better serve the increasing demands for mobile data, the spectrum used for LTE-U is shared with other communication protocols. In some examples, networks such as those operating in accordance with an Institute for Electronics and Electrical Engineers (IEEE) 802.11 standard (commonly referred to as Wi-Fi), those operating in accordance with a Bluetooth standard, those operating in accordance with an IEEE 802.15 standard (commonly referred to as ZigBee), and others may operate in these spectrum bands. In some examples, in order to avoid interference, the LTE-U network and the other networks in these frequency bands may time-divide the spectrum. That is, each network will have a portion of time (e.g., a time slot, time slice, or time window) during which that network has exclusive access to the medium. In other examples, the eNodeB (the base station) which provides the LTE-U cell, may monitor the medium for periods in which the medium is experiencing lighter traffic, and provide the LTE-U cell in those periods.

The goal in implementing LTE-U is to reuse existing LTE functionality to reduce implementation time and complexity. However, in order to implement this time-multiplexing scheme, the LTE-U cell operating in the unlicensed spectrum must be switched ON and OFF relatively quickly. Existing LTE functionality for signaling this to User Equipment (UE) is too slow.

Disclosed in some examples are methods, systems, and machine readable mediums which reuse existing LTE functionality or require only minor changes to the LTE specification to rapidly signal UEs on the availability of a LTE-U cell. Using these techniques the ON/OFF operation may be in the order of a few milliseconds (ms). Several techniques are disclosed herein, including use of component carrier (CC) specific Discontinuous Reception (DRX) signaling, Physical Downlink Control Channel (PDCCH) signaling, Downlink (DL) assignment based signaling, Physical Hybrid Automatic Repeat Request Indicator Channel (PH- ICH) signaling, Beacon signaling, and the like. As used herein the term Primary Cell or P-Cell is used to refer to a cell on the licensed frequency band, and the Secondary Cell or S-Cell is used to refer to a cell on the unlicensed frequency band. In some examples, the P-Cell and the S-Cell may include any number and combination of channels. Example channels may include control channels such as a PDCCH, data channels such as a Physical Downlink Shared Channel (PDSCH), PHICH channels, one or more beacon channels, or the like.

In some examples, for more dynamic operations (e.g., sub-frame), multiple indicators can be used in a hierarchy of indicators. For example, a second level of S-Cell availability indicator (or triggering) by the PDCCH (discussed below) can be applied and the second level of indicator (e.g., by the PDCCH) can override the first level indicator (e.g., DRX indicators).

Use of DRX Functionality

In some examples the availability of the LTE-U cell may be signaled through the modification of power saving techniques which put a mobile device to sleep. For example, DRX in LTE allows the UE to monitor the PDCCH at predetermined time periods rather than continuously. Monitoring the PDCCH at these predetermined time periods saves the UE's battery as opposed to monitoring the PDCCH continuously. In LTE, DRX is applied in a UE specific fashion—that is, the mobile is awake or asleep for all carriers a UE is associated with. In some examples, the DRX capabilities already present in LTE may be applied to the S-Cell carriers only.

In some examples, the eNodeB can determine the time periods for which the LTE-U cell is to be available. For example, the eNodeB may coordinate with other users of the unlicensed spectrum, either through direct messaging, or through medium sensing. The eNodeB may setup the UE's DRX parameters to coincide with the periods of S-Cell availability. For example, the UE may be awake and monitoring the PDCCH of the S-Cell when the S-Cell is available and may be in a DRX sleep period when the S-Cell is not available.

DRX parameters may include onDurationTimer which may be the number of frames over which the UE reads the PDCCH every DRX cycle before going to sleep. onDurationTimer thus specifies the length of time the UE remains awake once awoken. The DRX parameter LongDRXCycle is the duration of the "On" time defined by onDurationTimer plus the sleep time.

Figure 1:
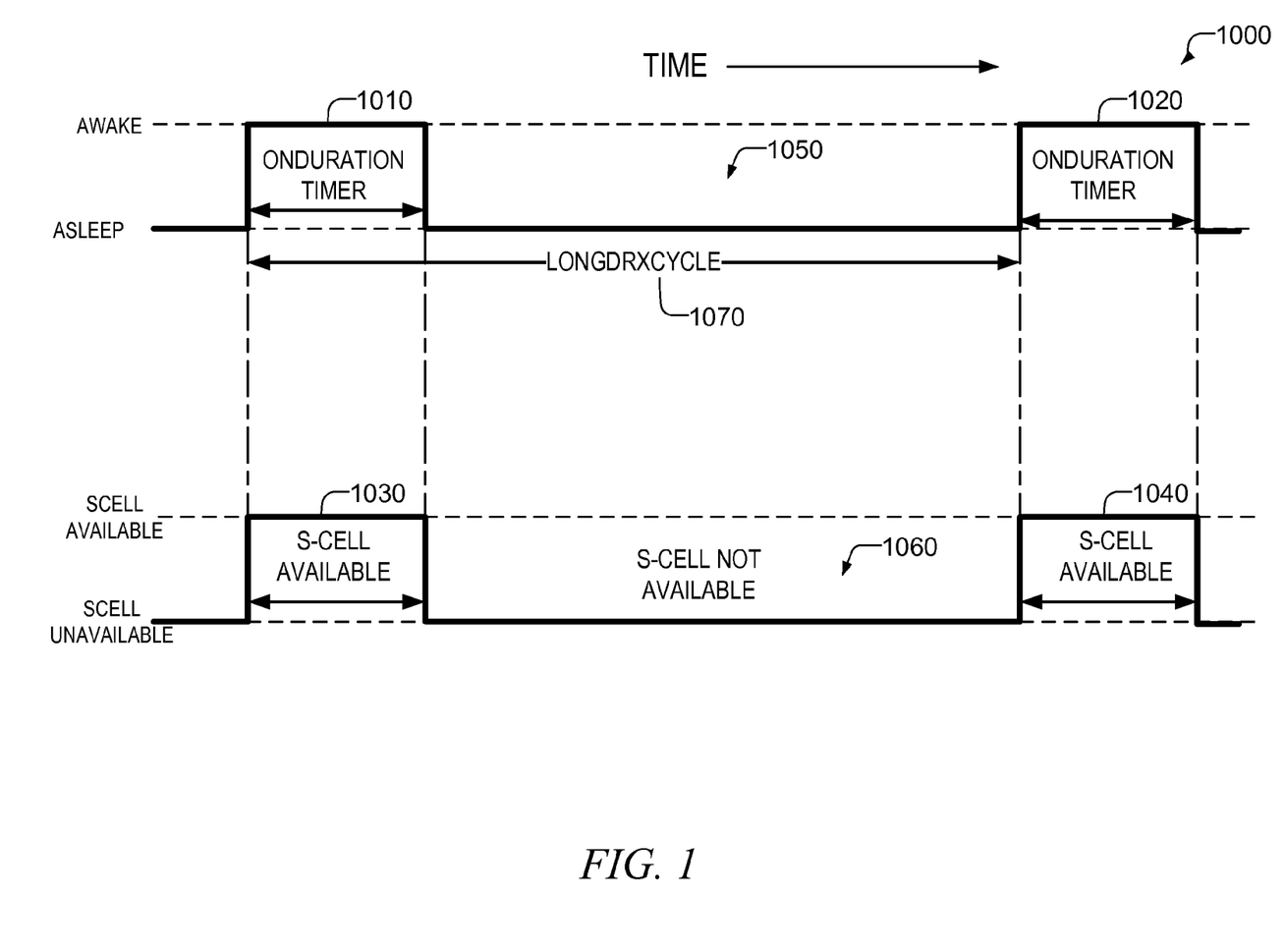
FIG. 1 shows an example timeline showing DRX availability, as determined by the parameters onDurationTimer and LongDRXCycle and a timeline of S-Cell availability according to some examples of the present disclosure.

FIG. 1 shows an example timeline 1000 showing DRX availability, as determined by the parameters onDurationTimer and LongDRXCycle and a timeline of S-Cell availability according to some examples of the present disclosure. As shown in FIG. 1, onDurationTimer specifies a length of time in which the UE is awake at 1010 and 1020, and in some examples, this can coincide with the time in which the S-Cell is available on the unlicensed spectrum 1030 and 1040. When the UE is awake the UE can monitor the PDCCH, receive the Physical Downlink Shared Channel (PDSCH), measure Channel State Information (CSI), and/or perform Radio Resource Management (RRM) measurements for the S-Cell. At time period 1050 the UE is asleep. When the UE is asleep, the UE will not monitor channels/signals for the S-Cell carrier (and in some examples, for the primary cell (P-Cell) as well) and can thus sleep. This also corresponds to the time the S-Cell is not available at 1060. In some examples, the UE may be awake and monitoring the PDCCH, receive the Physical Downlink Shared Channel (PDSCH), measuring Channel State Information (CSI), and/or performing Radio Resource Management (RRM) measurements for the P-Cell. During the period in which the S-Cell is not available, the S-Cell may be turned off. The LongDRXCycle 1070 specifies the entire DRX cycle and is calculated as the time the UE is awake+the time the UE is asleep. In FIG. 1, while the time the UE was awake coincided exactly with the time the S-Cell was available and the time the UE was asleep coincided exactly with the time the S-Cell was not available, in other examples, the UE may be awake for only part of the S-Cell availability.

Use of PDCCH

In carrier aggregation, multiple carriers are used to increase bandwidth while still maintaining compatibility with older devices. In some examples, the P-Cell and the S-Cell may be aggregated. When carrier aggregation is used there are two possible mechanisms for scheduling the S-Cell. In one possibility, called same carrier scheduling, each carrier schedules its own resources using its own PDCCH. In another possibility, called cross carrier scheduling, resources from the S-Cell are scheduled on the PDCCH on the P-Cell.

In some examples, an S-Cell is turned on or off by information fields in the PDCCH transmitted on the P-Cell (cross carrier scheduling), or by information fields in the PDCCH transmitted on the S-Cell (same carrier scheduling). The information field may be a simple binary 1 or 0 and may indicate that the S-Cell is available (or not available) currently, or during a particular period of time in the future.

In some examples, a particular field may be inserted into the PDCCH that indicates that the S-Cell is available or not. In other examples, one or more Radio Network Temporary Identifiers (RNTI) may be selected that convey this information. The RNTI is used to scramble a Cyclic Redundancy Check field of the PDCCH. Using a particular RNTI may indicate that the S-Cell is available, and the absence of the particular RNTI may indicate that the S-Cell is not-available. In other examples a particular RNTI may indicate that the S-Cell is not available and the absence of the particular RNTI may indicate that the S-Cell is available. In yet other examples, a particular RNTI may indicate that the S-Cell is available and a different RNTI may indicate that the S-Cell is not available.

In other examples, the S-Cell availability may be indicated by whether the eNodeB schedules the Physical Downlink Shared Channel (PDSCH) for the S-Cell, either on the P-Cell (cross-carrier scheduling) or the S-Cell (same carrier scheduling).

Figure 2A:
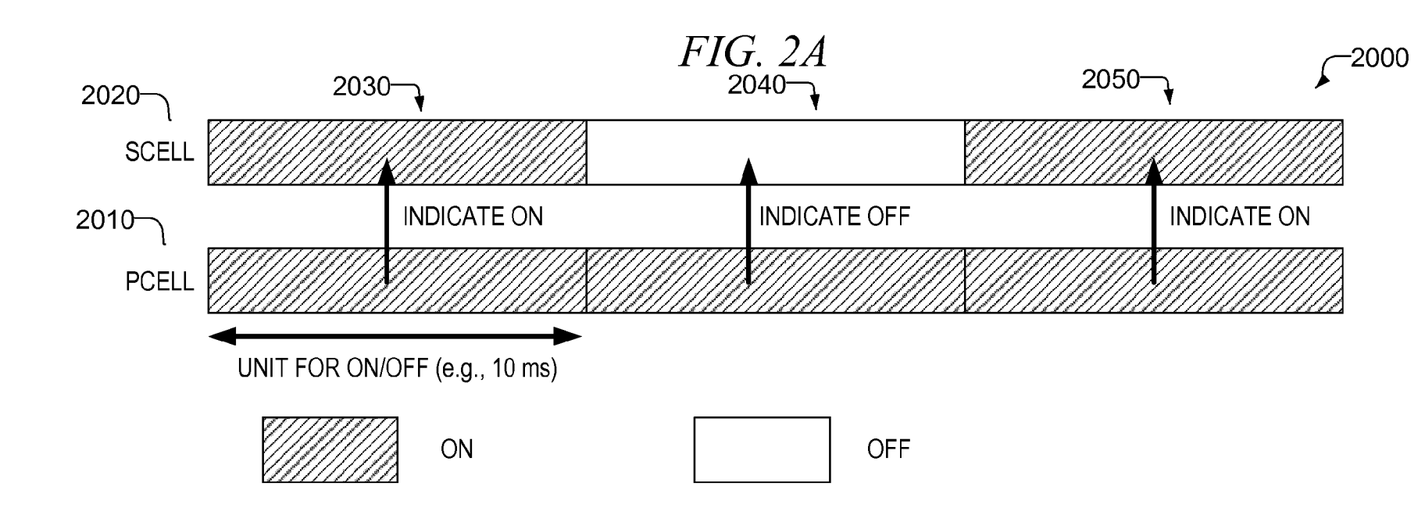
FIG. 2A shows a diagram of using the PDCCH of the P-Cell to indicate availability of the S-Cell according to some examples of the present disclosure.

FIG. 2A shows a diagram 2000 of using the PDCCH of the P-Cell to indicate availability of the S-Cell according to some examples of the present disclosure. The PDCCH on the P-Cell carrier 2010 indicates whether the S-Cell carrier 2020 is ON or OFF. In some examples, each time period 2030-2050 may be a particular unit of time (e.g., 10 milliseconds, 1 frame, and the like). At time unit 2030, the S-Cell is ON and the P-Cell indicates this in the PDCCH. For example, a bit-field in the PDCCH may indicate whether the S-Cell is ON or OFF. In other examples a particular RNTI value may be used to scramble the PDCCH CRC to indicate that the S-Cell is ON. At time unit 2040, the S-Cell is OFF, and the P-Cell indicates this in the PDCCH. For example, a bit-field in the PDCCH may indicate whether the S-Cell is ON or OFF. In other examples a particular RNTI value may be used to scramble the PDCCH CRC to indicate that the S-Cell is OFF. At time unit 2050, the S-Cell is ON and the P-Cell indicates this in the PDCCH. For example, a bit-field in the PDCCH may indicate whether the S-Cell ON or OFF. In other examples a particular RNTI value may be used to scramble the PDCCH CRC to indicate that the S-Cell is ON.

Figure 2B:
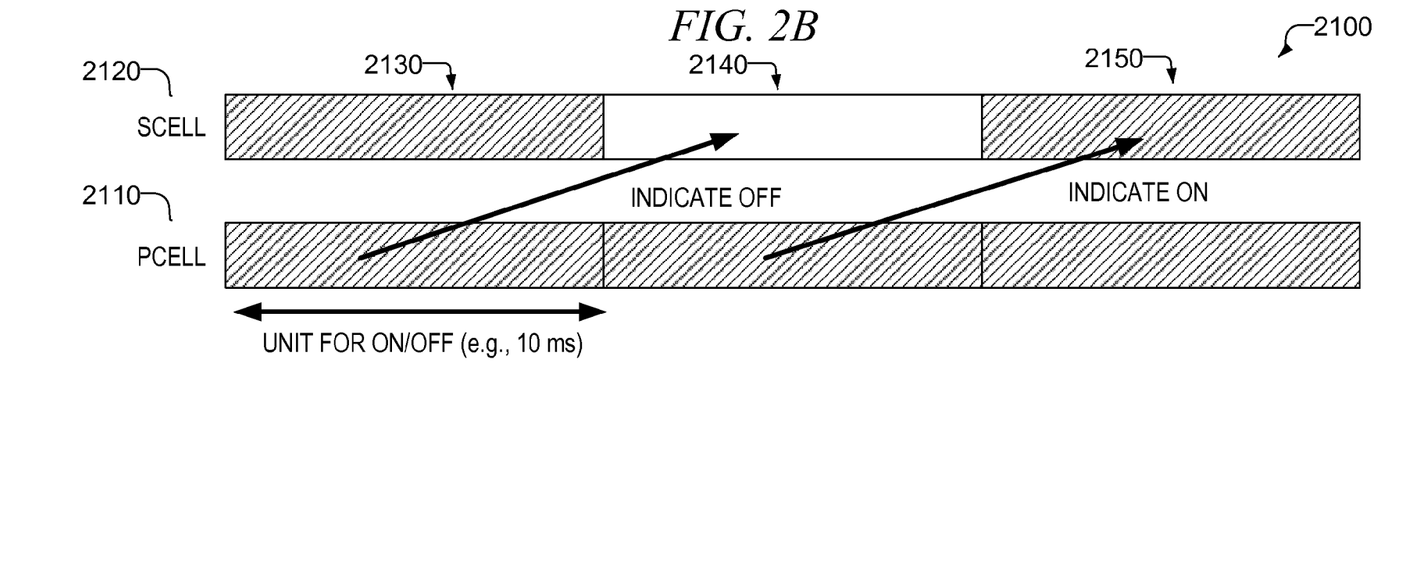
FIG. 2B shows a diagram of using the PDCCH of the P-Cell to indicate availability of the S-Cell according to some examples of the present disclosure.

FIG. 2B shows a diagram 2100 of using the PDCCH of the P-Cell to indicate availability of the S-Cell according to some examples of the present disclosure. The PDCCH on the P-Cell carrier 2110 indicates whether the S-Cell carrier 2120 is ON or OFF. In contrast to the example in FIG. 2A, the PDCCH of the P-Cell 2110 indicates the status of the S-Cell for a future time period. Shown in FIG. 2B, the future time period is the next time period, but in other examples, the indicator in the PDCCH of the P-Cell for the current time period may indicate S-Cell availability one or more time periods in the future. These examples may give the UE extra time to switch from the P-Cell to the S-Cell and back. In FIG. 2B, at time unit 2130, the S-Cell is ON, however, the P-Cell indicates that the S-Cell is OFF for time period 2140. The indicator in the PDCCH may be the same indicators discussed above with respect to FIG. 2A. At time unit 2140, the S-Cell is off, but the P-Cell indicates that the S-Cell is ON for time period 2150.

In some examples, the indication may be transmitted in any PDCCH transmitted from either the P-Cell or the S-Cell. For example, the S-Cell indication may be transmitted on a PDCCH transmitted on the P-Cell that is scheduling resources on the P-Cell. In another example, the S-Cell indication may be transmitted on a PDCCH scheduling resources on the S-Cell and either transmitted on the P-Cell or the S-Cell. In some examples, if the UE cannot receive an indication from the PDCCH, or cannot decode the PDCCH, the UE may assume the S-Cell is off.

While FIGS. 2A and 2B showed a single transmission of the indicator for indicating the available/unavailability of the S-Cell, in other examples, the indicator may be transmitted multiple times. This may reduce the false alarm detection due to a CRC error. For example, if a UE detects different indications for the S-Cell in the same time period, the UE may assume that the S-Cell is off to avoid unnecessary activity on the S-Cell during a period in which it may be unavailable (e.g., avoids unnecessary Channel State Information/Radio Resource Messaging measurements).

In some examples, a hybrid approach for FIGS. 2A and 2B may be employed whereby the PDCCH on the P-Cell may have indicators on the status of the S-Cell for both the current and a future time period.

Downlink Assignment (e.g., an (E)PDCCH) Indicators

Another indicator for the S-Cell status that may be used is the scheduling status in a sub-frame. The scheduling status of the sub-frame may implicitly indicate that the scheduled cell is turned ON in a sub-frame. If there is scheduling (i.e., the PDCCH exists from the scheduling cell) on the scheduled cell in a sub-frame, the cell is active in that sub-frame. If there is no scheduling (i.e., no PDCCH from the scheduling cell) on the scheduled cell in a sub-frame, the cell may be unavailable during that sub-frame.

In some examples, different types of PDCCHs can be defined for different purposes. For example, a first PDCCH may be used to schedule PDSCH resources, and a second PDCCH may be used to indicate the sub-frame for CSI and/or RRM measurements (i.e., the cell in the sub-frame is turned ON to transmit some signals to facilitate CSI/RRM measurements). This may be applicable to both self and cross carrier indications. An explicit bitfield may indicate ON or OFF states—in this case the PDCCH will be present. If semi-persistent scheduling (SPS) is configured for the S-Cell, at every sub-frame conveying the SPS PDSCH without the corresponding PDCCH the cell can be regarded as ON automatically.

Figure 3:
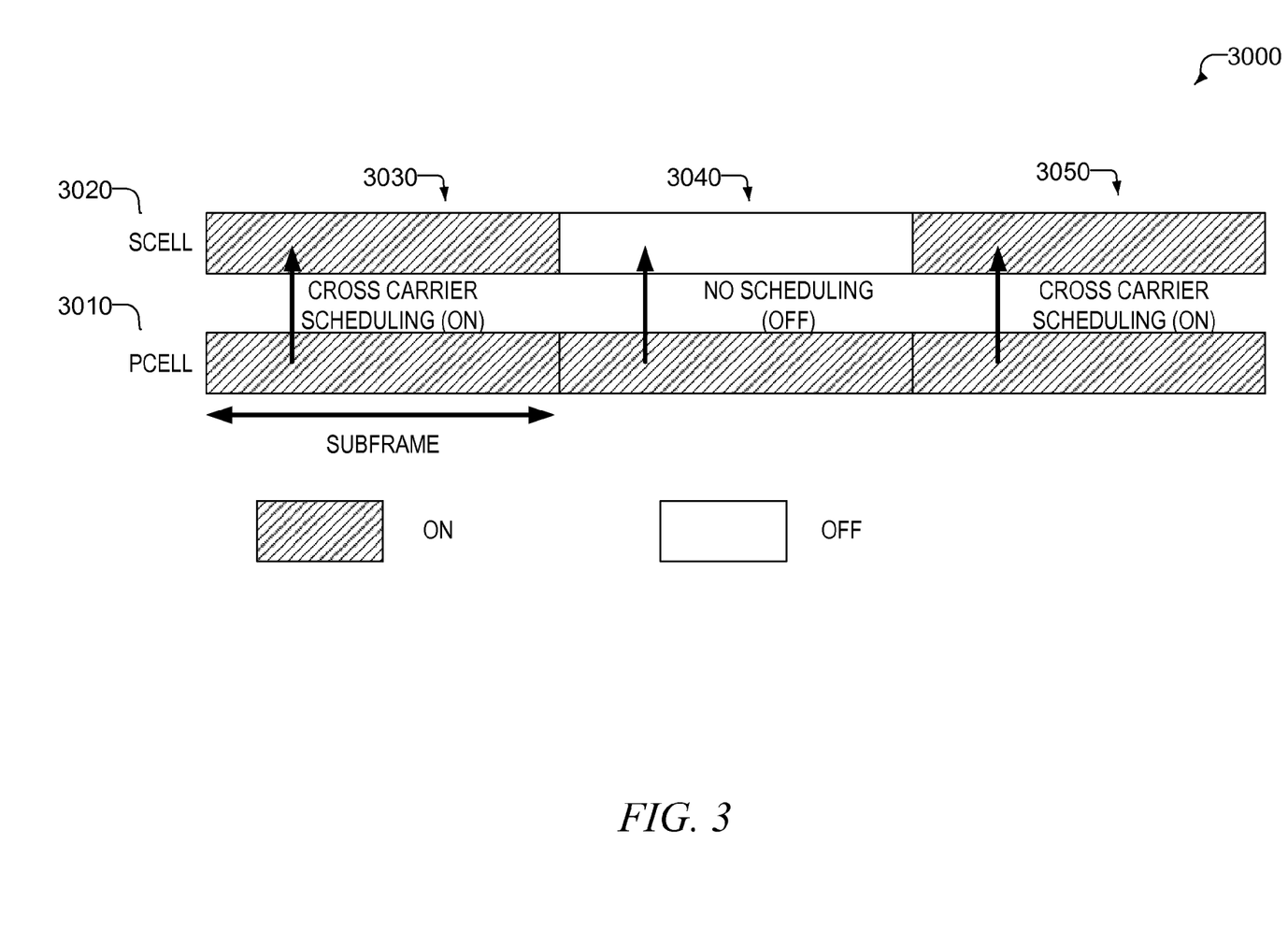
FIG. 3 shows a diagram of using scheduling to indicate availability of the S-Cell according to some examples of the present disclosure.

FIG. 3 shows a diagram 3000 of using scheduling to indicate availability of the S-Cell according to some examples of the present disclosure. At time period 3030 the P-Cell schedules the PDSCH (Physical Downlink Shared Channel) or the E-PDSCH for the S-Cell and thus the S-Cell is available for that period. At time period 3040 the P-Cell does not schedule anything for the PDSCH or the enhanced PDSCH (EPDSCH) for the S-Cell, and thus the S-Cell is not available for that period. At time period 3040 the P-Cell once again schedules the PDSCH or the EPDSCH for the S-Cell and thus the S-Cell is available for that period.

In some examples, the occurrence of the PDDCCH and the scheduled PDSCH may indicate a current availability of the S-Cell or may indicate an availability of the S-Cell in a future timeframe, similar to FIG. 2B.

PHICH Based Indicator

In some examples the Physical Hybrid-Automatic Repeat Request Indicator Channel (PHICH) may be used as an indicator for the availability of the S-Cell. The PHICH may be transmitted from the P-Cell or the S-Cell. The use of the PHICH channel as an indicator is similar to using the downlink assignment but using the PHICH channel. One of ordinary skill in the art with the benefit of Applicants' disclosure will appreciate that many different types of channels may be utilized.

For more dynamic operations (e.g., sub-frame), in some examples, multiple indicators can be used in a hierarchy of indicators. For example, a second level of S-Cell availability indicator (or triggering) by the PDCCH (discussed below) can be applied and the second level of indicator (e.g., by the PDCCH) can override the first level indicator (e.g., DRX indicators).

In some examples, the occurrence of the indicator on the PHICH may indicate a current availability of the S-Cell or may indicate an availability of the S-Cell in a future timeframe, similar to FIG. 2B.

Beacon Signal Based Indicators

In some examples various beacon signals may be utilized to indicate whether the S-Cell is available or not. In some examples, the presence or absence of the beacon signal may convey the availability or non-availability of the beacon signals. In other examples, the beacon signals may contain the indicator (e.g., a bit indicator). Example beacon signals can include one or more of: Primary Synchronization Signal (PSS), Secondary Synchronization Signal (SSS), Cell Specific Reference Signal (CRS), Channel State Information Reference Signals (CSI-RS), Positioning Reference Signals (PRS), or Discovery Reference Signal (DRS).

In some examples, if the beacon signal transmission time and frequency is predetermined or configured, the presence of the beacon at that time (e.g., at time unit N) indicates that the S-Cell is available at N+K, where K=0, 1, 2, . . . . In some examples, K may be predetermined, or in other examples K may be configurable.

Method and System Descriptions

Figure 4:
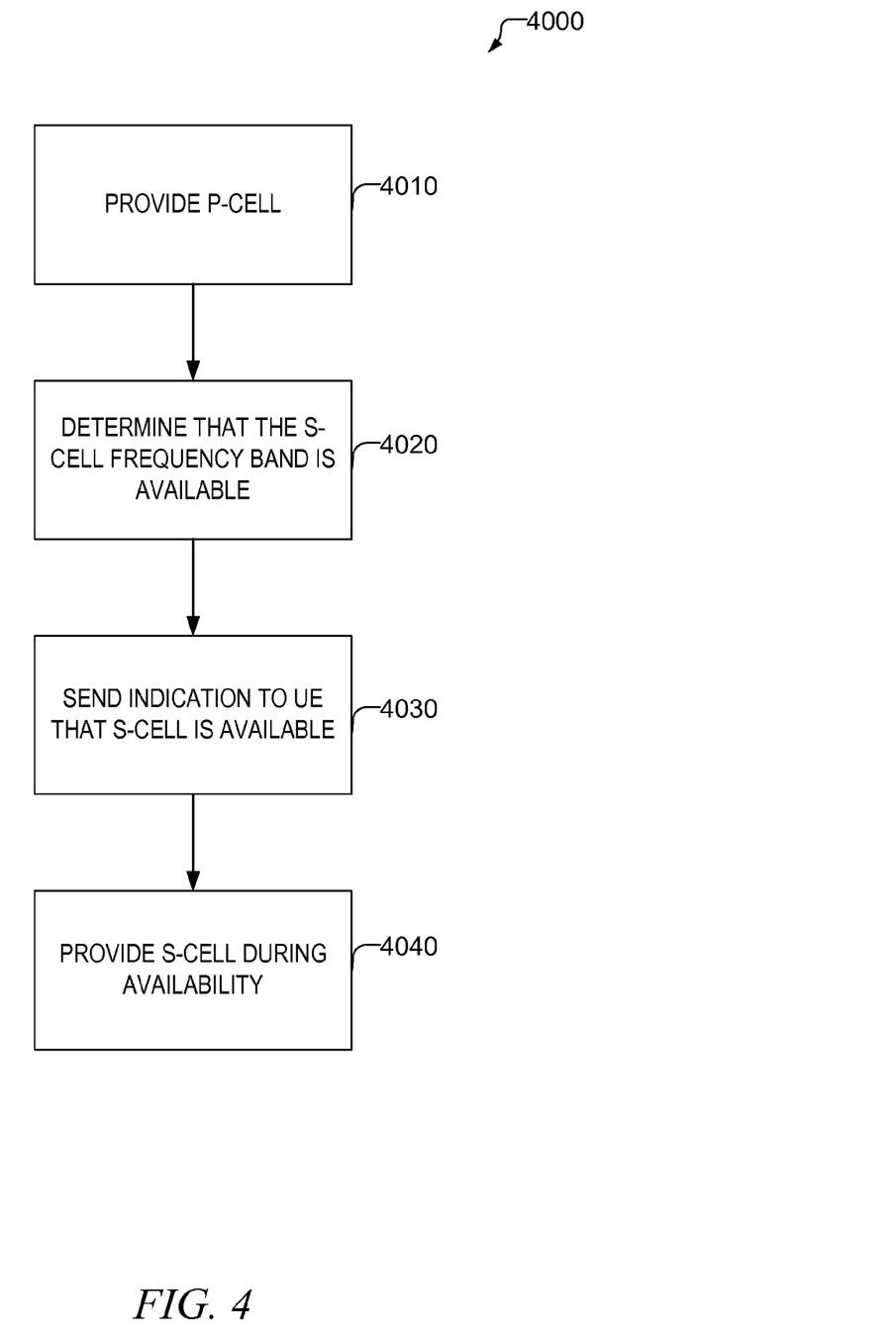
FIG. 4 shows a flowchart of a method of an eNodeB for indicating that the S-Cell is ON or OFF is shown according to some examples of the present disclosure.

Turning now to FIG. 4 a flowchart of a method 4000 of an eNodeB for indicating that the S-Cell is ON or OFF is shown according to some examples of the present disclosure. At operation 4010 the eNodeB may provide a primary cell (P-Cell). At operation 4020 the eNodeB may determine that the S-Cell frequency band is available to provide an S-Cell. This may be for the current time period, or for a future time period. The eNodeB may determine that the S-Cell frequency band is free based upon a time scheduling algorithm in which the eNodeB has certain time periods in which it may operate the S-Cell. In other examples the eNodeB may determine the medium is free by sensing for traffic on the medium. At operation 4030 the eNodeB may send an indication to the UE that the S-Cell is available. As already noted, this indication may take many forms. For example, the indication may be a DRX indication, a PDCCH indication, a scheduling indication, a beacon signal indication a PHICH indication and the like. At operation 4040 the eNodeB may provide the S-Cell during the determined availability.

Figure 5:
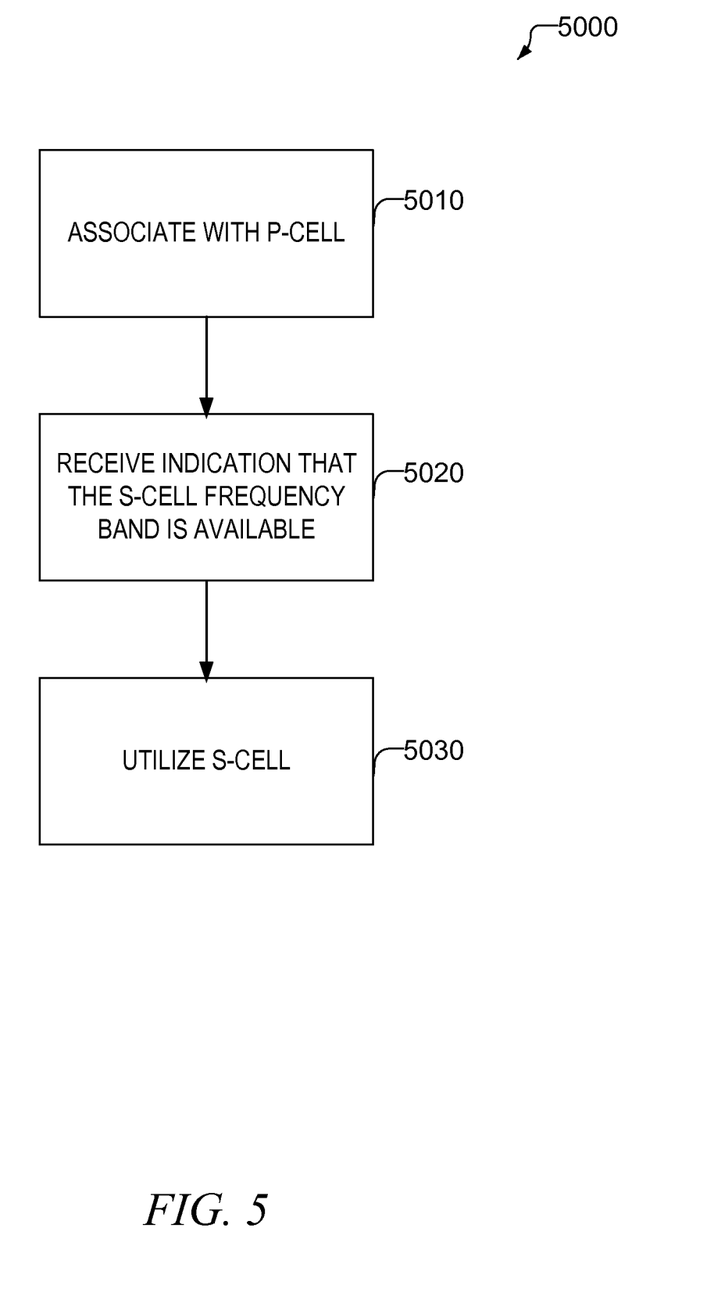
FIG. 5 shows a flowchart of a method performed by a UE of being notified of S-Cell availability is shown according to some examples of the present disclosure.

Turning now to FIG. 5, a flowchart of a method 5000 performed by a UE of being notified of S-Cell availability is shown according to some examples of the present disclosure. At operation 5010 the UE may associate with the P-Cell. At operation 5020 the UE may receive an indication that the S-Cell frequency band is available. As already noted this indication may take many forms. For example, the indication may be a DRX indication, a PDCCH indication, a scheduling indication, a beacon signal indication, a PHICH indication and the like. At operation 5030 the UE may utilize the S-Cell.

Figure 6:
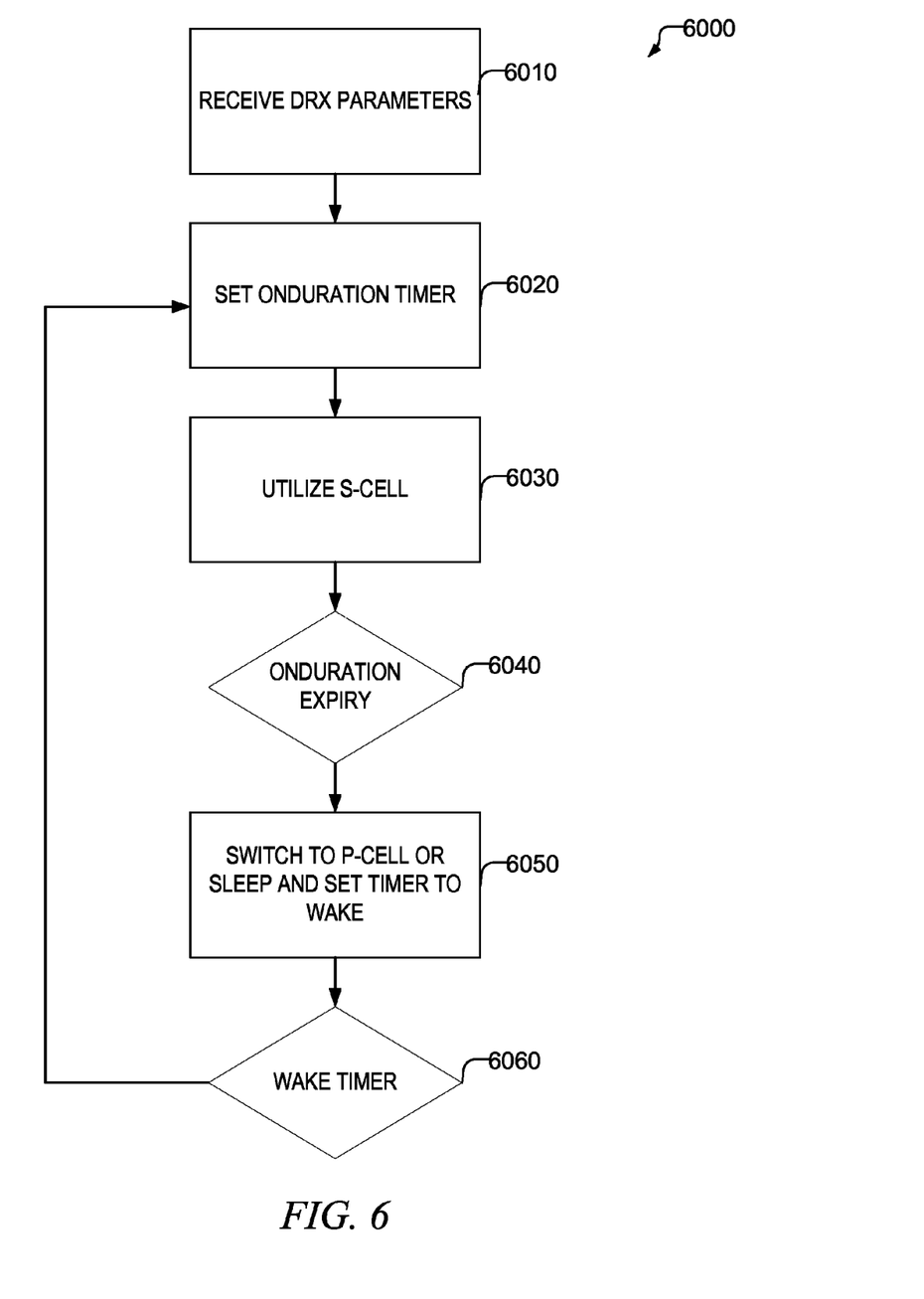
FIG. 6 shows a flowchart of a method performed by a UE to perform carrier specific DRX on an S-Cell is shown according to some examples of the present disclosure.

Turning now to FIG. 6, a flowchart of a method 6000 performed by a UE to perform carrier specific DRX on an S-Cell is shown according to some examples of the present disclosure. At operation 6010 the UE may receive DRX parameters from the eNodeB. These parameters may be received over either the S-Cell or P-Cell. For example, on the PDCCH. In some examples, these parameters may include LongDRXCycle and OnDurationTimer. At operation 6020, once the start of the first active period of the DRX period begins, the UE may set the OnDurationTimer 6020. At operation 6030 the UE may utilize the S-Cell. Once OnDurationTimer expires at operation 6040, the UE may switch back to the P-Cell or may go to sleep. The UE may also set a timer that is equal to the LongDRXCycle−onDurationTimer to set the timer for the next wake period. At operation 6060 this timer expires and the flow diagram may transition to repeating operations 6020-6060.

Figure 7:
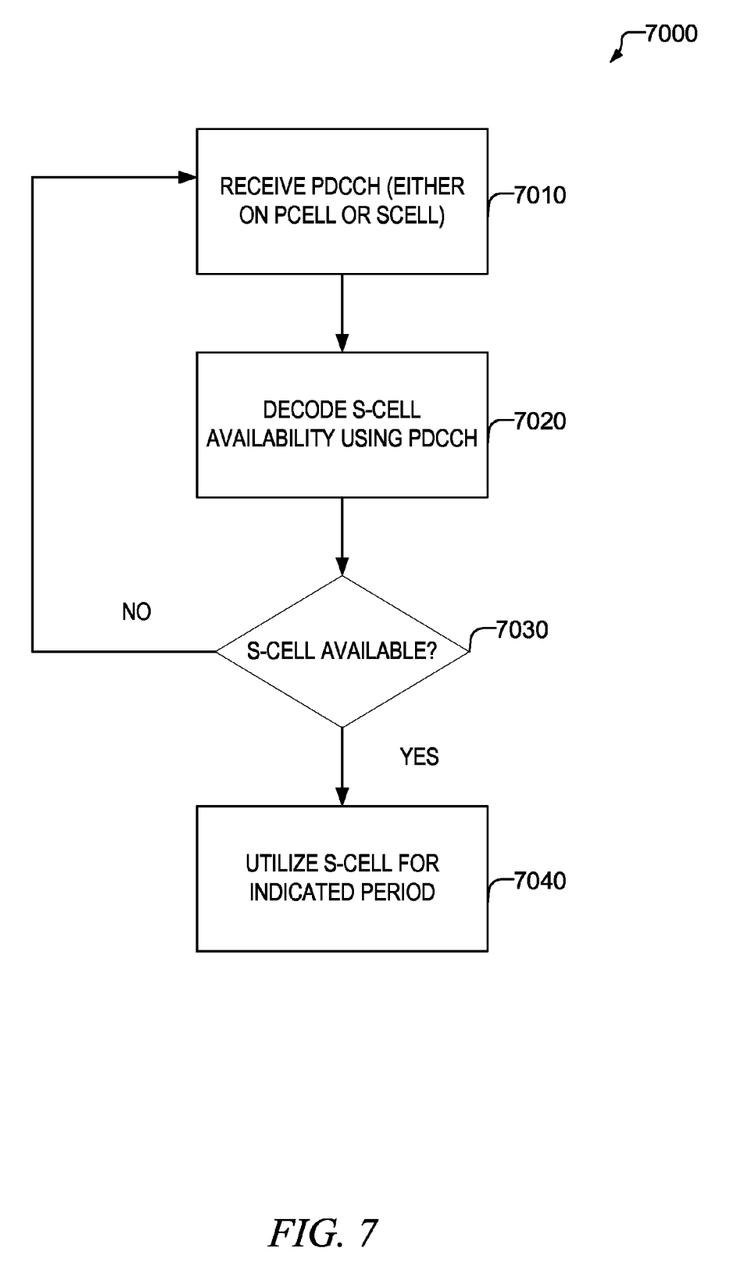
FIG. 7 shows a flowchart of a method performed by a UE to determine S-Cell availability is shown according to some examples of the present disclosure.

Turning now to FIG. 7, a flowchart of a method 7000 performed by a UE to determine S-Cell availability is shown according to some examples of the present disclosure. At operation 7010 the UE may receive the PDCCH on either the P-Cell or the S-Cell. At operation 7020 the UE may decode the S-Cell availability from the PDCCH. In some examples, the S-Cell availability may be determined by examining one or more fields in the PDCCH. In other examples, the RNTI used to decode the CRC bits may indicate whether the S-Cell is active or not. If the S-Cell is determined to be active at operation 7030, the UE may utilize the S-Cell for the indicated period 7040. If the S-Cell is not active, the UE may go back to normal operations, including receiving the PDCCH at operation 7010. Once the indicated period is over, the UE may also return to normal operations at operation 7010.

Figure 8:
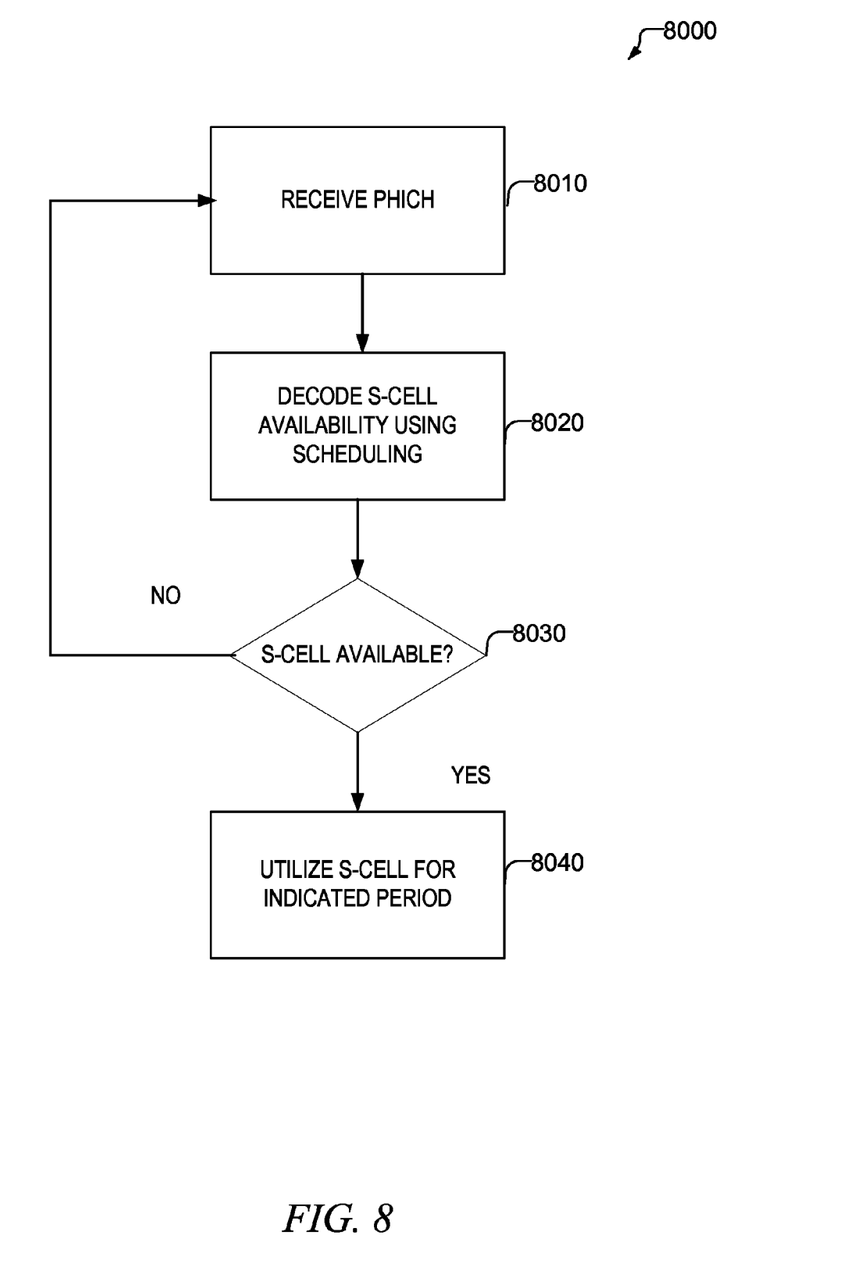
FIG. 8 shows a flowchart of a method performed by a UE to determine S-Cell availability is shown according to some examples of the present disclosure.

Turning now to FIG. 8, a flowchart of a method 8000 performed by a UE to determine S-Cell availability is shown according to some examples of the present disclosure. At operation 8010 the UE may receive the PHICH on either the P-Cell or the S-Cell. At operation 8020 the UE may decode the S-Cell availability by determining if the UE is scheduled on the S-Cell. If the S-Cell is determined to be active at operation 8030, the UE may utilize the S-Cell for the indicated period 8040. If the S-Cell is not active, the UE may go back to normal operations, including receiving the PDCCH at operation 8010. Once the indicated period is over, the UE may also return to normal operations at operation 8010.

Figure 9:
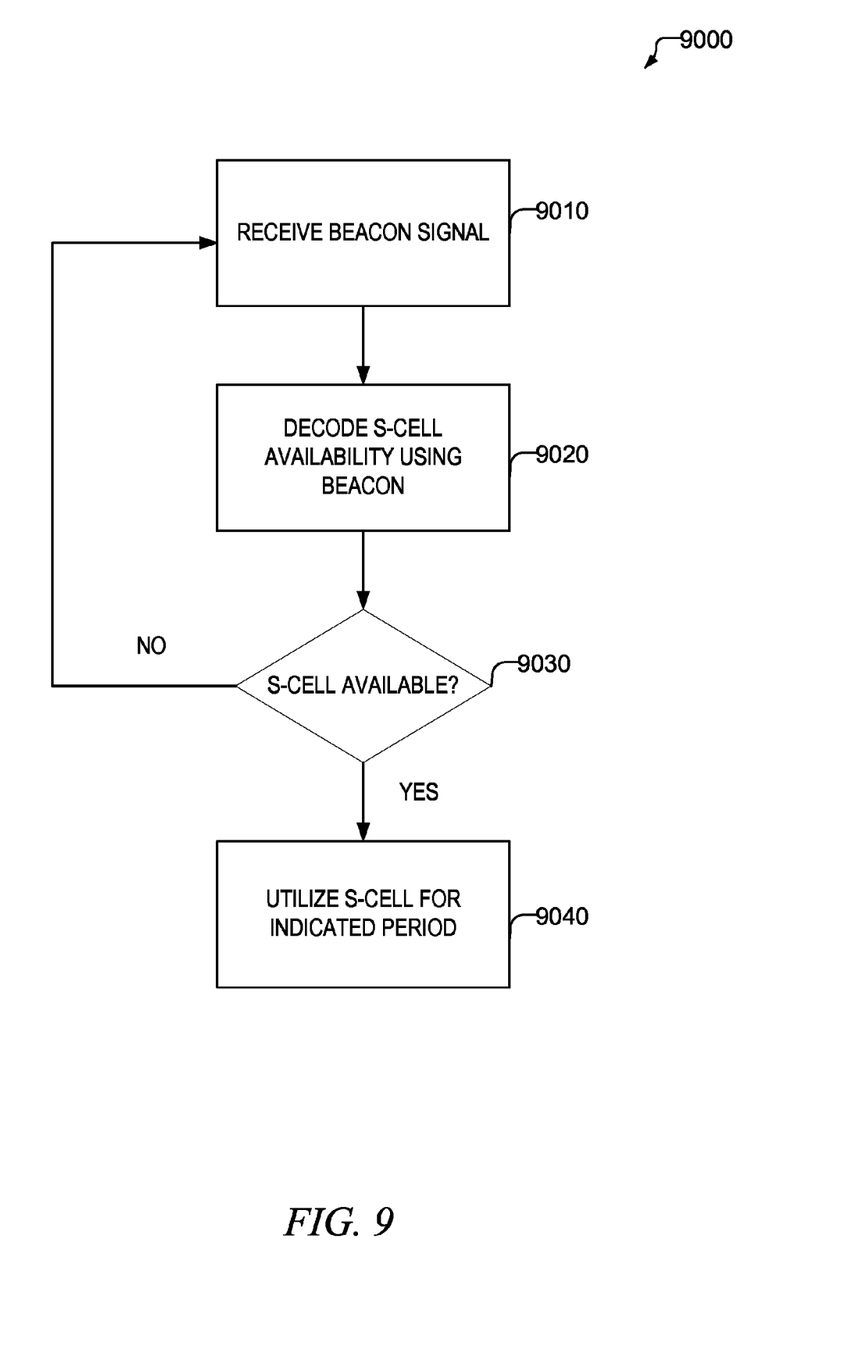
FIG. 9 shows a flowchart of a method performed by a UE to determine S-Cell availability is shown according to some examples of the present disclosure.

Turning now to FIG. 9, a flowchart of a method 9000 performed by a UE to determine S-Cell availability is shown according to some examples of the present disclosure. At operation 9010 the UE may receive a beacon signal on either the P-Cell or the S-Cell. At operation 9020 the UE may decode the S-Cell availability using information in the beacon as previously explained. If the S-Cell is determined to be active at operation 9030, the UE may utilize the S-Cell for the indicated period 9040. If the S-Cell is not active, the UE may go back to normal operations, including searching for the beacon at operation 9010. Once the indicated period is over, the UE may also return to normal operations at operation 9010.

Figure 10:
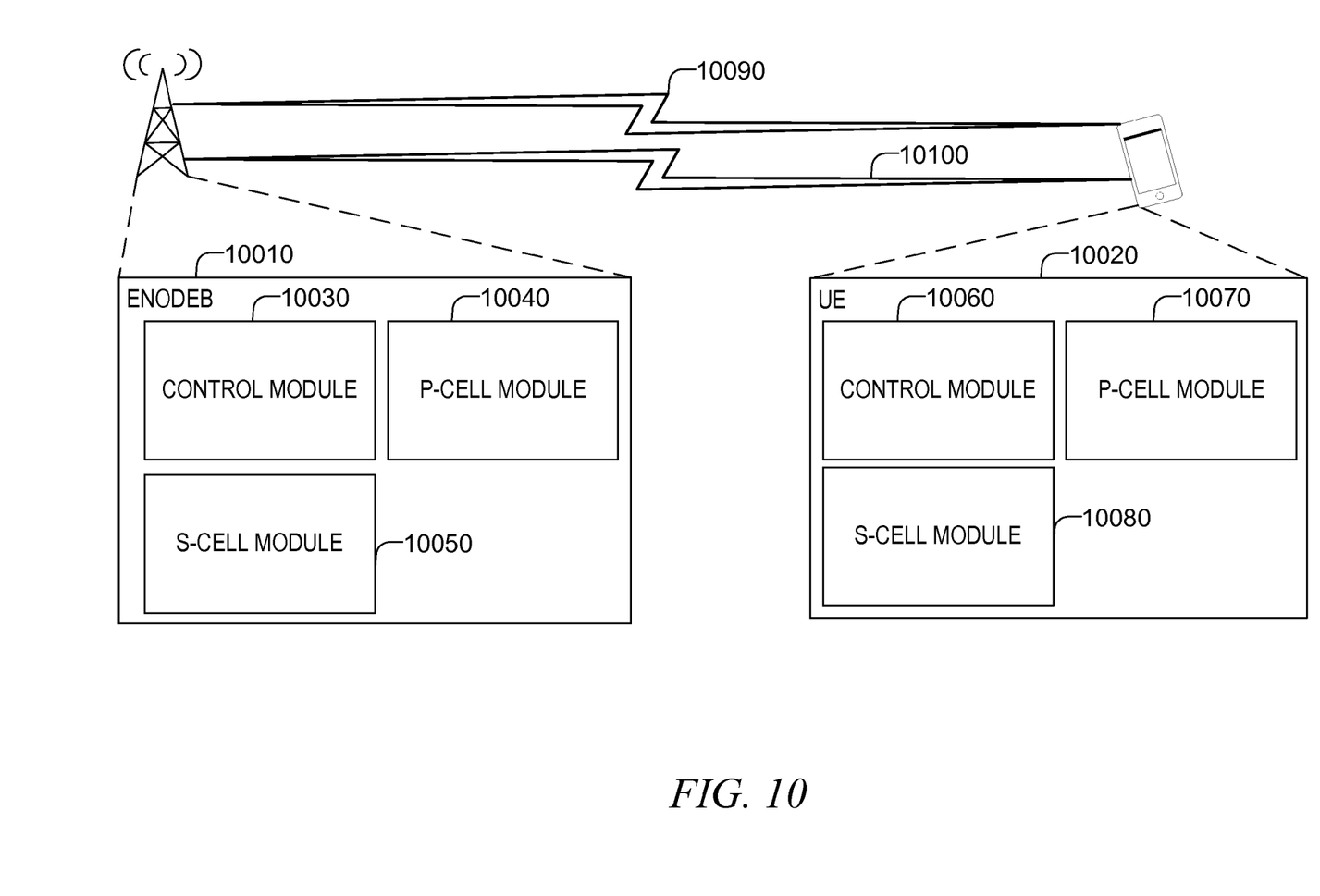
FIG. 10 shows a logical schematic of an eNodeB and a UE according to some examples of the present disclosure.

Turning now to FIG. 10, a logical schematic of an eNodeB 10010 and a UE 10020 is shown according to some examples of the present disclosure. eNodeB 10010 and UE 10020 may communicate over P-Cell connection 10090 and/or S-Cell connection 10100. eNodeB 10010 includes a control module 10030. Control module 10030 may coordinate providing an indication of S-Cell availability or unavailability to one or more UEs (such as UE 10020), providing a P-Cell, an S-Cell, and the like. Control module 10030 may determine when the S-Cell is available and may instruct other modules (e.g., P-Cell module 10040 and S-Cell module 10050) to transmit an indication of availability of the S-Cell to the UE according to any of the methods disclosed herein for providing a notification to the UE. In some examples, control module 10030 may determine one or more carrier specific (e.g., S-Cell specific) DRX parameters for one or more UEs (such as UE 10020) such that the UE is awake at time periods which coincide with the availability of the S-Cell. eNodeB 10010 may include P-Cell module 10040, which may provide the P-Cell, including any PDCCH channels, PDSCH channels, pilot channels, PHICH channels, beacon signals, and the like. S-Cell module 10050 may provide the S-Cell, including any PDCCH channels, PDSCH channels, pilot channels, PHICH channels, beacon signals, and the like.

UE 10020 may include a control module 10060 which may coordinate between utilizing the P-Cell and the S-Cell, as well as determining S-Cell availability. P-Cell module 10070 may associate with and communicate with eNodeB 10010 over the P-Cell 10090. P-Cell module 10070 may decode the PDCCH, beacon signals, PHICH, scheduling information, DRX information, and the like. S-Cell module 10080 may associate with and communicate with eNodeB 10010 over the S-Cell 10100. S-Cell module 10080 may decode the PDCCH, beacon signals, PHICH, scheduling information, DRX information, and the like. P-Cell module 10070 and S-Cell module 10080 may pass the indications received (e.g., DRX information, PDCCH indications, beacon signals, PHICH information, and the like) to control module 10060. Control module 10060 may determine based upon the indications if the S-Cell is available and in some examples, when the S-Cell is available. Control module 10060 may also configure the UE based upon any DRX parameters received. For example, control module 10060 may set one or more timers to wake and sleep the UE. In some examples, the control module may determine whether the UE is associated with the eNodeB through the P-Cell or S-Cell.

P-Cell modules 10040, 10070 may implement one or more layers of a protocol stack, including Physical (PHY) layers, Medium Access Control (MAC) layers, Radio Link Control, Packet Data Convergence Protocols, and the like for the P-Cell. S-Cell modules 10050, 10080 may implement one or more layers of a protocol stack, including Physical (PHY) layers, Medium Access Control (MAC) layers, Radio Link Control, Packet Data Convergence Protocols, and the like for the S-Cell. In some examples, the eNodeB 10010 and the UE may operate in accordance with a Long Term Evolution (LTE) family of standards promulgated by the $3^{rd}$ Generation Partnership Project (3GPP). Other example protocols that the UE and eNodeB may operate according to include a Universal Mobile Telecommunications Systems (UMTS), a Global System for Mobile Communications (GSM) and the like.

Figure 11:
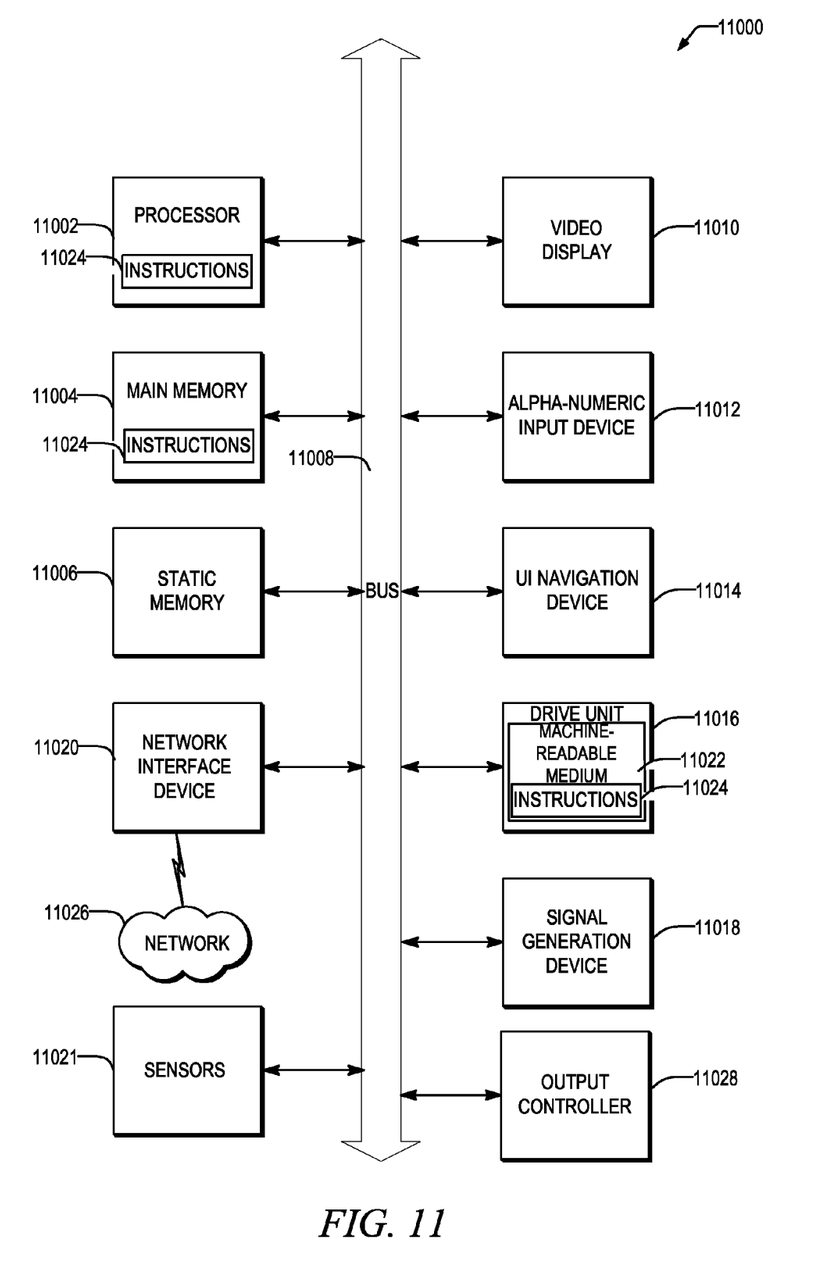
FIG. 11 is a block diagram illustrating an example of a machine upon which one or more embodiments may be implemented.

FIG. 11 illustrates a block diagram of an example machine 11000 upon which any one or more of the techniques (e.g., methodologies) discussed herein may perform. In alternative embodiments, the machine 11000 may operate as a standalone device or may be connected (e.g., networked) to other machines. In a networked deployment, the machine 11000 may operate in the capacity of a server machine, a client machine, or both in server-client network environments. In an example, the machine 11000 may act as a peer machine in peer-to-peer (P2P) (or other distributed) network environment. The machine 11000 may be a UE, eNodeB, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. The machine 11000 may implement any one of the modules of FIG. 10. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 11000 may include a hardware processor 11002 (e.g., a central processing unit (CPU), a graphics processing unit (GPU), a hardware processor core, or any combination thereof), a main memory 11004 and a static memory 11006, some or all of which may communicate with each other via an interlink (e.g., bus) 11008. The machine 11000 may further include a display unit 11010, an alphanumeric input device 11012 (e.g., a keyboard), and a user interface (UI) navigation device 11014 (e.g., a mouse). In an example, the display unit 11010, input device 11012 and UI navigation device 11014 may be a touch screen display. The machine 11000 may additionally include a storage device (e.g., drive unit) 11016, a signal generation device 11018 (e.g., a speaker), a network interface device 11020, and one or more sensors 11021, such as a global positioning system (GPS) sensor, compass, accelerometer, or other sensor. The machine 11000 may include an output controller 11028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 11016 may include a machine readable medium 11022 on which is stored one or more sets of data structures or instructions 11024 (e.g., software) embodying or utilized by any one or more of the techniques or functions described herein. The instructions 11024 may also reside, completely or at least partially, within the main memory 11004, within static memory 11006, or within the hardware processor 11002 during execution thereof by the machine 11000. In an example, one or any combination of the hardware processor 11002, the main memory 11004, the static memory 11006, or the storage device 11016 may constitute machine readable media.

While the machine readable medium 11022 is illustrated as a single medium, the term "machine readable medium" may include a single medium or multiple media (e.g., a centralized or distributed database, and/or associated caches and servers) configured to store the one or more instructions 11024.

The term "machine readable medium" may include any medium that is capable of storing, encoding, or carrying instructions for execution by the machine 11000 and that cause the machine 11000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 11024 may further be transmitted or received over a communications network 11026 using a transmission medium via the network interface device 11020. The Machine 11000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 11020 may include one or more physical jacks (e.g., Ethernet, coaxial, or phone jacks) or one or more antennas to connect to the communications network 11026. In an example, the network interface device 11020 may include a plurality of antennas to wirelessly communicate using at least one of single-input multiple-output (SIMO), multiple-input multiple-output (MIMO), or multiple-input single-output (MISO) techniques. In some examples, the network interface device 11020 may wirelessly communicate using Multiple User MIMO techniques.

Other Notes and Examples

Example 1 includes subject matter (such as a method, means for performing acts, machine readable medium that stores instructions which when performed by a machine, cause the machine to perform operations) for signaling a User Equipment (UE) when a cell is available in an unlicensed frequency band comprising: providing a primary cell (P-Cell) on a licensed frequency band; determining that an unlicensed frequency band is available for use by a secondary cell (S-Cell) for a determined time window; sending an indication to the UE that the unlicensed frequency band is available for use by the S-Cell, the indication signaling the UE that the frequency band is available for use by the UE for at least a portion of the determined time window; and providing the S-Cell in the frequency band for the determined time window.

In example 2, the subject matter of example 1 may optionally include wherein the indication is a Radio Resource Control (RRC) message specifying a Discontinuous Reception (DRX) cycle which instructs the UE to access the S-Cell during the determined time window.

In example 3, the subject matter of any one or more of examples 1-2 may optionally include wherein the indication is located in a Physical Downlink Control Channel (PDCCH).

In example 4, the subject matter of any one or more of examples 1-3 may optionally include wherein the indication is a bit field in the PDCCH.

In example 5, the subject matter of any one or more of examples 1-4 may optionally include wherein the operations of sending the indication comprises building the PDCCH by scrambling a Cyclic Redundancy Check field of the PDCCH using a predetermined Radio Network Temporary Identifier (RNTI) that indicates that the unlicensed frequency band is available for use by the S-CELL.

In example 6, the subject matter of any one or more of examples 1-5 may optionally include wherein the operations of sending the indication comprises scheduling a Physical Downlink Shared Channel (PDSCH) of the S-Cell on the PDCCH, the PDCCH sent on the P-Cell.

In example 7, the subject matter of any one or more of examples 1-6 may optionally include wherein the operations of sending the indication comprises scheduling a Physical Downlink Shared Channel (PDSCH) of the S-Cell on the PDCCH, the PDCCH sent on the S-Cell.

In example 8, the subject matter of any one or more of examples 1-7 may optionally include wherein the indication is located in a Physical Hybrid-ARQ Indicator Channel (PHICH).

In example 9, the subject matter of any one or more of examples 1-8 may optionally include wherein the indication is located in a beacon signal.

In example 10, the subject matter of any one or more of examples 1-9 may optionally include wherein the at least a portion of the determined time window is the entire determined time window.

In example 11, the subject matter of any one or more of examples 1-10 may optionally include wherein the operations of providing the S-Cell comprise providing the S-Cell only in the determined timeslot and in one or more other successive timeslots.

In example 12, the subject matter of any one or more of examples 1-11 may optionally include wherein the determined time window is configured in a cell specific manner.

Example 13 includes or may optionally be combined with the subject matter of any one of examples 1-12 to include subject matter (such as a eNodeB, device, apparatus, or machine) comprising hardware processing circuitry configured to: provide a P-Cell on a primary frequency band; determine that a secondary frequency band is available for use by a secondary cell (S-Cell) during a time slot; transmit an indication to a UE that the S-Cell is available for association during the time slot; and provide the S-Cell during the time slot, the S-Cell including a data channel.

In example 14, the subject matter of any one or more of examples 1-13 may optionally include wherein the indication is a Radio Resource Control (RRC) message specifying a Discontinuous Reception (DRX) cycle which instructs the UE to access the S-Cell during the determined time slot.

In example 15, the subject matter of any one or more of examples 1-14 may optionally include wherein the indication is located in a Physical Downlink Control Channel (PDCCH).

In example 16, the subject matter of any one or more of examples 1-15 may optionally include wherein the indication is a bit field in the PDCCH.

In example 17, the subject matter of any one or more of examples 1-16 may optionally include wherein the hardware processing circuitry is to send the indication by at least building the PDCCH by scrambling a Cyclic Redundancy Check field of the PDCCH using a predetermined Radio Network Temporary Identifier (RNTI) that indicates that the unlicensed frequency band is available for use by the S-CELL.

In example 18, the subject matter of any one or more of examples 1-17 may optionally include wherein the hardware processing circuitry is to send the indication by at least scheduling a Physical Downlink Shared Channel (PDSCH) of the S-Cell on the PDCCH, the PDCCH sent on the P-Cell.

In example 19, the subject matter of any one or more of examples 1-18 may optionally include wherein the hardware processing circuitry is to send the indication by at least scheduling a Physical Downlink Shared Channel (PDSCH) of the S-Cell on the PDCCH, the PDCCH sent on the S-Cell.

In example 20, the subject matter of any one or more of examples 1-19 may optionally include wherein the indication is located in a Physical Hybrid-ARQ Indicator Channel (PHICH).

In example 21, the subject matter of any one or more of examples 1-20 may optionally include wherein the indication is located in a beacon signal.

In example 22, the subject matter of any one or more of examples 1-21 may optionally include wherein the at least a portion of the determined timeslot is the entire determined timeslot.

In example 23, the subject matter of any one or more of examples 1-22 may optionally include wherein the S-Cell is only provided in the determined timeslot and in one or more other successive timeslots.

In example 24, the subject matter of any one or more of examples 1-23 may optionally include wherein the determined timeslot is configured in a cell specific manner.

Example 25 includes or may optionally be combined with the subject matter of any one of examples 1-24 to include subject matter (such as a UE, device, apparatus, or machine) comprising: hardware processing circuitry configured to: associate with a P-Cell on a licensed frequency band provided by an eNodeB; receive an indication on the P-Cell that a secondary-cell (S-Cell) is available on an unlicensed frequency band at a particular time period; associate with the S-Cell on the unlicensed frequency band for the particular time period, the S-Cell provided by the eNodeB.

In example 26, the subject matter of any one or more of examples 1-24 may optionally include wherein the indication is a Radio Resource Control (RRC) message specifying a Discontinuous Reception (DRX) cycle.

In example 27, the subject matter of any one or more of examples 1-26 may optionally include wherein the indication is located in a Physical Downlink Control Channel (PDCCH).

In example 28, the subject matter of any one or more of examples 1-27 may optionally include wherein the indication is a bit field in the PDCCH.

In example 29, the subject matter of any one or more of examples 1-24 may optionally include wherein the indication is the use of a particular Radio Network Temporary Identifier (RNTI) to scramble a Cyclic Redundancy Check (CRC) of the PDCCH.

In example 30, the subject matter of any one or more of examples 1-29 may optionally include wherein the indication is the eNodeB scheduling a Physical Downlink Shared Channel (PDSCH) of the S-Cell on the PDCCH, the PDCCH being received on the P-Cell.

In example 30, the subject matter of any one or more of examples 1-29 may optionally include wherein the indication is the eNodeB scheduling a Physical Downlink Shared Channel (PDSCH) of the S-Cell on the PDCCH, the PDCCH being received on the S-Cell.

In example 31, the subject matter of any one or more of examples 1-30 may optionally include wherein the indication is located in a Physical Hybrid-Automatic Repeat Request (ARQ) Indicator Channel (PHICH).

In example 32, the subject matter of any one or more of examples 1-31 may optionally include wherein the indication is located in a beacon signal.

Example 33 includes or may optionally be combined with the subject matter of any one of examples 1-32 to include subject matter (such as a method, means for performing acts, a machine readable medium including instructions for performing operations) for accessing a cell comprising: at a user equipment (UE): associating with a P-Cell on a licensed frequency band provided by an eNodeB; receiving an indication on the P-Cell that a secondary-cell (S-Cell) is available on an unlicensed frequency band at a particular time period; associating with the S-Cell on the unlicensed frequency band for the particular time period, the S-Cell provided by the eNodeB.

In example 35, the subject matter of any one or more of examples 1-34 may optionally include wherein the indication is a Radio Resource Control (RRC) message specifying a Discontinuous Reception (DRX) cycle.

In example 36, the subject matter of any one or more of examples 1-35 may optionally include wherein the indication is located in a Physical Downlink Control Channel (PDCCH).

In example 37, the subject matter of any one or more of examples 1-36 may optionally include wherein the indication is a bit field in the PDCCH.

In example 38, the subject matter of any one or more of examples 1-37 may optionally include wherein the indication is the use of a particular Radio Network Temporary Identifier (RNTI) to scramble a Cyclic Redundancy Check (CRC) of the PDCCH.

In example 39, the subject matter of any one or more of examples 1-38 may optionally include wherein the indication is the eNodeB scheduling a Physical Downlink Shared Channel (PDSCH) of the S-Cell on the PDCCH, the PDCCH being received on the P-Cell.

In example 40, the subject matter of any one or more of examples 1-39 may optionally include wherein the indication is the eNodeB scheduling a Physical Downlink Shared Channel (PDSCH) of the S-Cell on the PDCCH, the PDCCH being received on the S-Cell.

In example 41, the subject matter of any one or more of examples 1-40 may optionally include wherein the indication is located in a Physical Hybrid-Automatic Repeat Request (ARQ) Indicator Channel (PHICH).

In example 42, the subject matter of any one or more of examples 1-41 may optionally include wherein the indication is located in a beacon signal.

What is claimed is:
1. An eNodeB, comprising:
hardware processing circuitry configured to:
provide a primary cell (P-Cell) on a primary frequency band during a first time slot;
determine that a secondary frequency band is available for use by a secondary cell (S-Cell) during a second time slot, the second time slot being a subsequent time slot to the first time slot and the second frequency band being different than the primary frequency band; and
transmit an indication to a User Equipment (UE) during the first time slot, that the S-Cell is available for association after the first time slot and during the determined subsequent time slot, the subsequent time slot being associated with a timing boundary defining a beginning time and an end time of the subsequent time slot; and
an S-Cell module configured to:
provide the S-Cell during the subsequent time slot, the S-Cell including a data channel.

2. The eNodeB of claim 1, wherein the indication is a Radio Resource Control (RRC) message specifying a Discontinuous Reception (DRX) cycle which instructs the UE to access the S-Cell during the determined subsequent time slot.

3. The eNodeB of claim 1, wherein the indication is located in a Physical Downlink Control Channel (PDCCH).

4. The eNodeB of claim 3, wherein the indication is a bit field in the PDCCH.

5. The eNodeB of claim 3, wherein the indication is located in a Physical Hybrid-ARQ Indicator Channel (PHICH).

6. The eNodeB of claim 1, wherein the indication is located in a beacon signal.

7. The eNodeB of claim 1, wherein the indication is located in a physical downlink shared channel (PDSCH) associated with the P-Cell.

8. The eNodeB of claim 1, wherein the S-Cell is only provided in the determined timeslot and in one or more other successive timeslots.

9. The eNodeB of claim 1, wherein the determined timeslot is configured in a cell specific manner.

10. A non-transitory machine-readable medium that stores instructions which when performed by a machine, cause the machine to perform operations for signaling a User Equipment (UE) when a cell is available in an unlicensed frequency band, the operations comprising:
providing a primary cell (P-Cell) on a licensed frequency band;
determining that an unlicensed frequency band is available for use by a secondary cell (S-Cell) for a determined time window, the time window associated with a current or future time period with a determined timing boundary;
sending an indication to the UE that the unlicensed frequency band is available for use by the S-Cell, the indication signaling the UE that the frequency band is available for use by the UE for at least a portion of the determined time window; and
providing the S-Cell in the frequency band for the determined time window.

11. The machine-readable medium of claim 10, wherein the indication is a Radio Resource Control (RRC) message specifying a Discontinuous Reception (DRX) cycle which instructs the UE to access the S-Cell during the determined time window.

12. The machine-readable medium of claim 10, wherein the indication is located in a Physical Downlink Control Channel (PDCCH).

13. The machine-readable medium of claim 12, wherein the indication is a bit field in the PDCCH.

14. The machine-readable medium of claim 12, wherein the operations of sending the indication comprises building the PDCCH by scrambling a Cyclic Redundancy Check field of the PDCCH using a predetermined Radio Network Temporary Identifier (RNTI) that indicates that the unlicensed frequency band is available for use by the S-CELL.

15. The machine-readable medium of claim 12, wherein the operations of sending the indication comprises scheduling a Physical Downlink Shared Channel (PDSCH) of the S-Cell on the PDCCH, the PDCCH sent on the P-Cell.

16. The machine-readable medium of claim 12, wherein the operations of sending the indication comprises scheduling a Physical Downlink Shared Channel (PDSCH) of the S-Cell on the PDCCH, the PDCCH sent on the S-Cell.

17. The machine-readable medium of claim 10, wherein the indication is located in a Physical Hybrid-ARQ Indicator Channel (PHICH).

18. The machine-readable medium of claim 10, wherein the indication is located in a beacon signal.

19. A user equipment (UE), comprising:
memory; and
hardware processing circuitry, the hardware processing circuitry configured to:
associate with a primary cell (P-Cell) on a licensed frequency band provided by an eNodeB;
receive an indication on the P-Cell that a secondary cell (S-Cell) is available on an unlicensed frequency band at a particular time period defined by a particular timing boundary; and
associate with the S-Cell on the unlicensed frequency band for the particular time period, the S-Cell provided by the eNodeB.

20. The UE of claim 19, wherein the indication is a Radio Resource Control (RRC) message specifying a Discontinuous Reception (DRX) cycle.

21. The UE of claim 19, wherein the indication is located in a Physical Downlink Control Channel (PDCCH).

22. The UE of claim 19, wherein the indication is located in a Physical Hybrid-Automatic Repeat Request (ARQ) Indicator Channel (PHICH).

23. The UE of claim 19, wherein the indication is located in a beacon signal.

* * * * *